United States Patent
Kawana et al.

[11] Patent Number: 5,371,931
[45] Date of Patent: Dec. 13, 1994

[54] PRODUCTION SYSTEM FOR MOLDED AND PRESSED PARTS

[75] Inventors: Takeshi Kawana; Toshiyuki Amimoto, both of Yokohama; Yasuhiro Fujita, Yokosuka; Yuuji Enomoto; Tatsuya Niinomi, both of Yokohama; Sadao Ohara, Fujisawa; Shin Hashizume, Kamakura; Yasuo Shibasaki, Kanagawa; Tatsuhisa Matsunaga, Fujisawa; Takeshi Yano, Yokohama, all of Japan

[73] Assignee: Hitachi Ltd., Tokyo, Japan

[21] Appl. No.: 941,964

[22] Filed: Sep. 8, 1992

[30] Foreign Application Priority Data

Oct. 8, 1991 [JP] Japan .................. 3-260671

[51] Int. Cl.$^5$ .................. B23Q 7/14; B29C 69/00
[52] U.S. Cl. .................. 29/33 K; 29/793; 425/575
[58] Field of Search .................. 29/564.4, 793, 453, 29/33 R, 33 K; 425/556, 525, 437, 517

[56] References Cited

U.S. PATENT DOCUMENTS

| | | | |
|---|---|---|---|
| 3,784,261 | 1/1974 | Potter et al. | 425/437 X |
| 4,012,827 | 3/1977 | Abrams | 29/453 |
| 4,315,885 | 2/1982 | Lemelson | 425/575 X |
| 4,351,630 | 9/1982 | Hayberg et al. | 425/517 |
| 4,411,608 | 10/1983 | Yanagisawa | 29/564.4 X |
| 5,037,597 | 8/1991 | McGinley | 425/556 X |
| 5,060,368 | 10/1991 | Chen | 29/793 |

FOREIGN PATENT DOCUMENTS

| | | | |
|---|---|---|---|
| 299897 | 12/1988 | Japan | 29/33 R |
| 165916 | 6/1990 | Japan | 29/33 R |

*Primary Examiner*—William Briggs
*Attorney, Agent, or Firm*—Antonelli, Terry, Stout & Kraus

[57] ABSTRACT

Software and hardware such as part feeding and assembling devices constituting a production system are simplified with the use of a plurality of processing and assembly integrated units in which processing and assembling of parts are coupled and integrated in accordance with products to be produced. The necessities for an automatic warehouse and an automated ground vehicle are eliminated by getting rid of futility of mere movements of the parts. A fundamental idea is that a production system is constructed of units in which three sections—a section for processing a raw material, a check functional section and an assembling section—are integrally combined in accordance with the products to be produced. The parts are processed, checked and assembled by single units just in time while targeting molded parts of plastic and pressed parts.

10 Claims, 21 Drawing Sheets

FIG. 17a
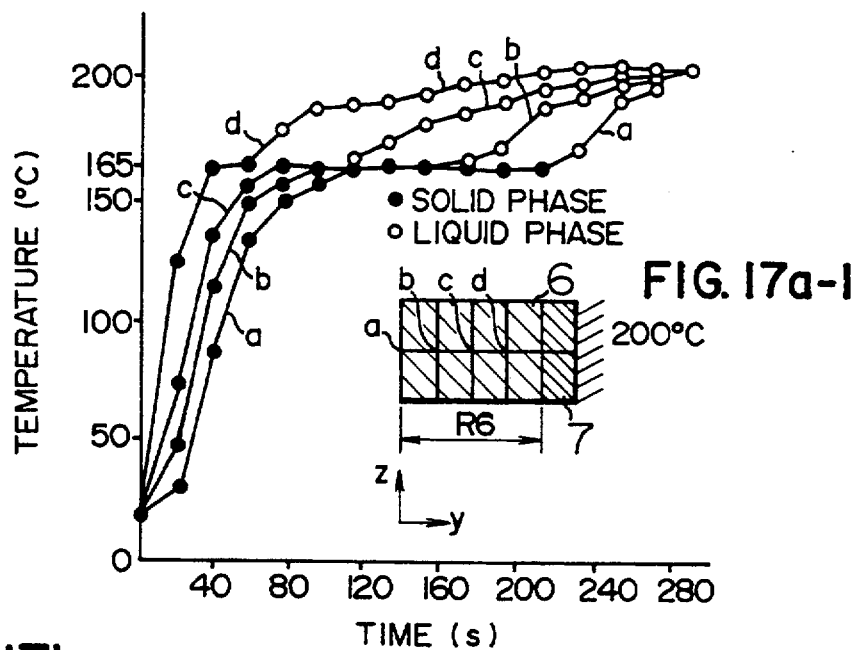
FIG. 17a-1
FIG. 17b
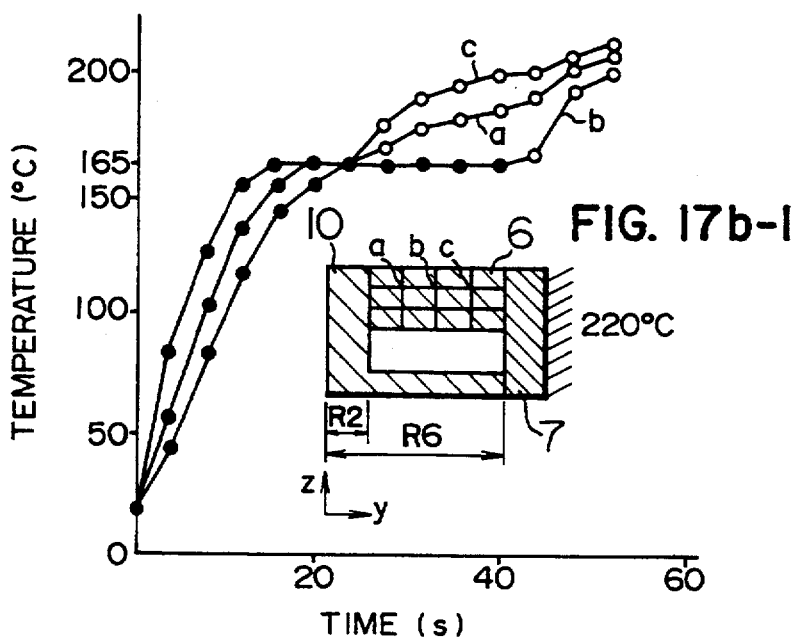
FIG. 17b-1

PRODUCTION SYSTEM FOR MOLDED AND PRESSED PARTS

BACKGROUND OF THE INVENTION

The present invention relates generally to a production system for producing so-called electromechanical products such as home electric products of VTR, etc. and OA products of printers, etc. that are composed of plastic molded parts, sheet metal pressed parts and machine processed parts as well as to a control method therefor and, more particularly, to a production system and a control method therefor that are suitable for eliminating the necessity for an automatic warehouse, an automated ground vehicle and so forth by getting rid of futility of mere movements of the parts by use of a plurality of units in which processing and assembling of the parts are integrated in accordance with products to be produced.

A typical construction of a so-called FA system is illustrated in the upper section of FIG. 1. It is a common practice for such a system that processing and assembling of parts are performed separately in different places over organizations or enterprises. The parts are processed in a part processing shop or a subcontract factory, then inspected and packed, and the thus packed parts are carried to an assembly shop. In the assembly shop, the parts are put into an automatic warehouse after undergoing acceptance inspections and taken out of the warehouse in accordance with a demand from the assembly line. The parts are carried by an automated ground vehicle or the like to an assembly station. In the assembly station, an assembly robot arrays, grasps and assembles the parts, if necessary, with the aid of visual recognition.

Corresponding to such a tendency, in the field of automation technology, industrial robots, automated ground vehicles and automatic warehouses have been developed. Developed and introduced in the sector of production management are an idea and technique of aggregating the parts in the assembly shop just in time and a variety of techniques of transferring the target parts at a high efficiency within the assembly shop. Then, they are integrated and controlled by computers, thus constituting FA (Factory Automation) and serving as a part of CIM (Computer Integrated Manufacturing).

Exemplified for introducing an injection molding machine on the assembly line is a production system constructed such that, as disclosed in Japanese Patent Laid-Open No. 2-165916, dies are circulated on a carrier line, and a plurality of molded parts necessary for a product are sequentially supplied in accordance with the assembly process via a clamping station, an injection station and an opening station. Alternatively, a system is, as disclosed in Japanese Patent Laid-Open No. 63-299897, constructed such that a plurality of working dies are mounted on a rotary table which is then rotated and necessary processing is effected on a terminal of an elongate member with a single press machine capable of pressing the respective working dies moved up and down. In either system, handling of the parts is simplified by circulating the dies, but this is still separate from the assembly process. Assembling to the product requires a separate means for re-grasping the part. For this reason, there arises a problem in which a part configuration possible of automatic assembly is limited. Further, the dies form the line, and hence only the necessary parts can not be obtained at a necessary time. Besides, there exists a problem in which management works such as a die maintenance, etc. are rather complicated.

FIG. 2 shows a constructive example of parts (except purchased parts) to be assembled in the assembly line of an OA appliance. A plastic molded part, a sheet metal pressed part and a machined part are ranked in this order. In home electric products and OA products, though different depending on the products, the situation is the same. Hence, a plastic part (especially small-sized molded parts) oriented unit and a pressed part oriented unit are needed as the above-described units.

A conventional injection molding machine has such a typical structure that a heating cylinder is vertically fixed to one of movable and fixed dies, a screw rotatable and movable in the axial direction is supported or fixed therein and a hopper is supported or fixed to the opposite end of the dies (p. 2, a book entitled "Precise Injection Molding", published by Kaibundo, written by Masuzawa).

A resin is melted by a band heater attached to an outer periphery of the heating cylinder. The resin assuming a melted state in the heating cylinder is extruded and charged into the dies with an advancing motion of the screw. Further, the resin is kept under pressure by rotations of the screw, thereby forming a molded part. Besides, the screw retreats to a predetermined position for next molding while feeding the resin forwards with the rotations thereof. As a mechanism for driving and controlling the screw, there are provided an actuator for rotating the screw at a rear end of the screw and an actuator for injection, and the actuators are activated to move the screw back and forth through ball screws. Simultaneously, there is adopted a system for controlling the injection force, injection speed and injection quantity through sensors such as a pressure sensor, a pulse generator and a tacho-generator (p. 33. vol. 7, Plastic Molding Technology).

In association with take-out of the molded part, there exists a structure for taking out the molded part by catching a portion of the molded part with chucks while the fixed die moves on this side, although it is usual that the molded part is dropped down by ejecting it with an ejector after opening the dies. Both the structures are not connected directly with the product on the assembly line (p. 62, No. 2, vol. 36, National Technical Report).

As a method of feeding the resin into the heating cylinder, the pellet resin put in the hopper, which is installed at the rear portion of the heating cylinder, is dropped down into the heating cylinder and consecutively extruded in front of the screw.

Further, the injection molding machine generally does not have therein a mechanism for inspecting the molded parts. The quality thereof is checked by effecting a sampling inspection on a lot unit after molding.

It is desired that the automatic warehouse and the automated ground vehicle be made unnecessary by eliminating the process and the device by which any added values are not generated as in the case of simply moving the parts in the above-described production system. It is simultaneously desired that the production system constructed of totally simple hardware and software be actualized by simplifying the parts feed and assembly devices. Moreover, it is desirable to attain reductions both in preparation and management work incidental to a supply of the parts and also an extending the possibility of assembly automation (flexible and unshaped parts, etc.).

SUMMARY OF THE INVENTION

Accordingly, it is a primary object of the present invention in view of the problems inherent in the prior arts to provide a production system of molded parts and a control method therefor that are capable of making unnecessary an automatic warehouse and an automated ground vehicle by eliminating futility of a mere movement of the parts by using a plurality of units in which working and assembling of the parts are integrated in accordance with a product to be produced.

The fundamental idea to accomplish the object described above in accordance with the invention is that the production system is constructed by use of multiple or combined units (hereinafter referred to as a working and assembly combined units), in which the processing and the assembling of the parts are, as shown in the lower section of FIG. 1, consecutively composited, as a substitute for the foregoing production system or as the one which compensates for it. This unit is, as will be mentioned below, composed of a section for processing a raw material, an assembling section and a checking section.

Namely, according to one aspect of the invention, there is provided a production system of molded parts, including a working and assembly combined unit comprising: a material feeding means for feeding a raw material of molded parts by one-part unit; an injection molding means for processing and molding the fed raw material in a predetermined shape with a predetermined size in accordance with preset process conditions; an assembling means for taking molded parts out of the injection molding means with grasping means and assembling the molded parts to target parts in assembling positions on an assembly line continuous with a production line of the injection molding means at the same coordinate level with the production line with aid of handling of the grasping means; and an inspecting means for inspecting the molded parts by monitoring the process conditions.

According to another aspect of the invention, there is provided a production system of molded parts, including a plastic parts oriented processing and assembly combined unit comprising: an injection molding means for heat-melting raw pellets fed by single part unit, injecting the melted pellets into dies, molding the melted pellets in a predetermined shape with predetermined dimensions through a clamping mechanism; an assembling means for taking molded parts out of the die and assembling the molded parts to target parts in assembling positions on an assembly line continuous with a production line of the injection molding means at the same coordinate level with the production line with aid of handling of the grasping means; and an inspecting means for inspecting the molded parts by monitoring working process conditions of the injection molding.

It is preferable that the injection molding means is composed of: a material feed section capable of quantitative feed by measuring and discharging the raw pellets of single part unit from a hopper which has stored the raw pellets; a heating section having one or more than two plunger type heating cylinders for heat-melting the raw pellets fed from the material feeder section; an extrusion section capable of injecting the fused pellets in the heating cylinder and having a vibration mechanism for vibrating a vertically moving plunger up and down in the heating cylinder; dies consisting of a fixed die, a movable die capable of an opening/closing movement and a robot hand serving also as a molded part grasping means for forming a cavity for the molded part by intervening in between the fixed die and the movable die when the two dies are closed; and a clamping section for effecting clamping by causing the movable die of the dies to make the opening/closing movement.

Further, the material feeder section preferably includes: a measuring means for measuring mass of the hopper, which stores the raw pellets, before and after feeding the material and detecting overs and shorts of the raw pellet of single part unit from a difference therebetween; and a means, constructed of a feeder screw, for feeding the raw pellets. The heating section preferably consists of: a heater holder for supporting the heating cylinder; an induction heating coil wound on an outer periphery of the heating cylinder; a bar-like heating column composed of a material identical or similar to that of the heating cylinder and arranged coaxially with the heating cylinder; and a heating pin, so provided at a lower end of the heating cylinder as to be slidable in vertical directions, for sealing the melted pellets within the heating cylinder except when injecting. The extrusion section preferably includes: a stage vertically movable with aid of a rotating ball screw; and a vibrating mechanism consisting of a piezo vibrator for vibrating up and down the plunger secured to the stage. The clamping section preferably includes: a double toggle mechanism connected to a mount and the movable die of the dies through pins; and a driving section of the double toggle mechanism, for clamping the dies in the horizontal direction through the double toggle mechanism.

Further, the assembling means preferably includes: a triaxial drive assembling robot in which the robot hand constituting the dies is secured to the tip of an arm; and a driving mechanism for opening and closing the robot hand in parallel. The inspecting means preferably includes a mass measuring section capable of respectively measuring a total mass of the arm of the assembling robot and of the robot hand grasping the molded part and a total mass of the robot arm and of the robot hand which does not grasp the molded part.

Moreover, according to still another aspect of the invention, there is provided a production system of molded parts, including a pressed part oriented processing and assembly integrated unit comprising: a means for feeding a hoop material by single part unit; a means for driving a ram plate through a plurality of toggle mechanisms; dies putting a pressed part therebetween in a pressurized state and having a notch enough to grasp the pressed part with a pressed part grasping means; and a means for grasping and moving the pressed part to be assembled by taking the pressed part out of the dies.

On the other hand, according to a further aspect of the invention, there is provided a control method of controlling a production system of molded parts, characterized by using an apparatus comprising: a means for inputting and storing a number of products to be produced; a counting means for counting base parts for assembly processed respectively by a plastic part oriented processing and assembly combined unit, a pressed part working and assembly combined unit and another working and assembly combined unit similar thereto; a means for computing a number of the base parts to be processed by the respective units in accordance with an input value from the counting means and the number of the products to be produced; and a means for computing and outputting a quantity of and a timing for the raw material to be supplied from a quantity of the raw materials which have already been fed to the respective units, a number of the base parts for assembly which have already been processed by the respective units and a number of the base parts to be processed subsequently.

The plastic part oriented processing and assembly integrated unit is preferably so constructed as to make a temperature for melting the raw pellets changeable to lower the temperature, when waiting for a time in excess of a predetermined time occurs in the processing and assembling of the molded parts, in accordance with this waiting time. Further, the respective units are preferably controlled corresponding to changes in type of products to be produced as well as in the assembly line of the molded parts by means of a control device for being inputted with and outputting, to the respective units, data about a type and a quantity of the raw material to be fed, a change in the dies for use, working process conditions and also positional data necessary for handling the molded parts.

With the construction described above, in the plastic part oriented working and assembly combined unit, the screw feed mechanism provided in a hopper section is driven and controlled by a pulse motor, thereby feeding a raw pellet for one molded part to the heating cylinder in accordance with a flow of the production line. The pellet is quickly melted by the induction heating. At this moment, a melting speed increases owing to the heating column which stands on the central axis of the heating cylinder. When lowering the plunger to inject the resin, vibrations are given by the piezo element so that sufficient molding can be performed even under a low pressure. Further, the assembly hand functions as a part of the dies during the molding but shifts directly to the assembling operation on the occasion of assembly. Handling of the part is thereby simplified without re-taking hold of the parts and is simultaneously made consecutive enough to deal with even parts of complicated configurations. Furthermore, masses of the hand and of the molded part are measured in the course of the handling, thus judging quality of all the molded parts. In this manner, the parts are processed just in time and assembled after being checked of their configurations, etc. Hence, the parts are not scattered, and the handling is facilitated.

Besides, in the press part oriented working and assembly combined unit, the pressed part grasping means grasps the pressed part in a pressurized state, i.e., in a state where the press part is caught by the stroke end of a ram. In other words, the press part is taken directly out of the dies and assembled. The press section is constructed such that the ram is driven by a plurality of toggle mechanisms to effect the pressurization.

On the other hand, the production system having the working and assembly combined units is controlled in the following manner.

(1) The raw material is replenished by computing a quantity of the raw material to be replenished to each station and a timing for the replenishment from a number of products to be produced and a throughput as well.

(2) In elimination of ill-processed parts, through control and monitoring of process conditions and inspection of parts, 100% well-processed parts are secured, or defective parts are ejected, which securing or ejecting is indispensable to the case where the processing and the assembling are directly linked.

(3) To cope with an intermittent operation peculiar to the assembly line, in the plastic part oriented processing and assembly integrated unit, if the operation is stopped longer than a given time, setting of a temperature of the resin is changed.

(4) When locating parts to be assembled and the worked part, the part to be assembled and the processed part are arranged in the same coordinate system.

(5) To cope with changes in type, the raw material is replenished, the dies are replaced and the process conditions are modified in synchronization with the changes in type.

BRIEF DESCRIPTION OF THE DRAWINGS

The above and other objects and advantages of the invention will become apparent during the description which will be made in conjunction with the accompanying drawings, in which:

FIGS. 17(a) and (b) and 17(a)-1 and (b)-1 are diagrams showing simulations of changes in temperature between a case where a heating column is not provided and a case where the heating column is provided;

DETAILED DESCRIPTION OF THE PREFERRED EMBODIMENTS

Plastic Part Oriented Working And Assembly Combined Unit

An embodiment of the invention will be described with reference to FIGS. 3 through 18.

Figure 1:
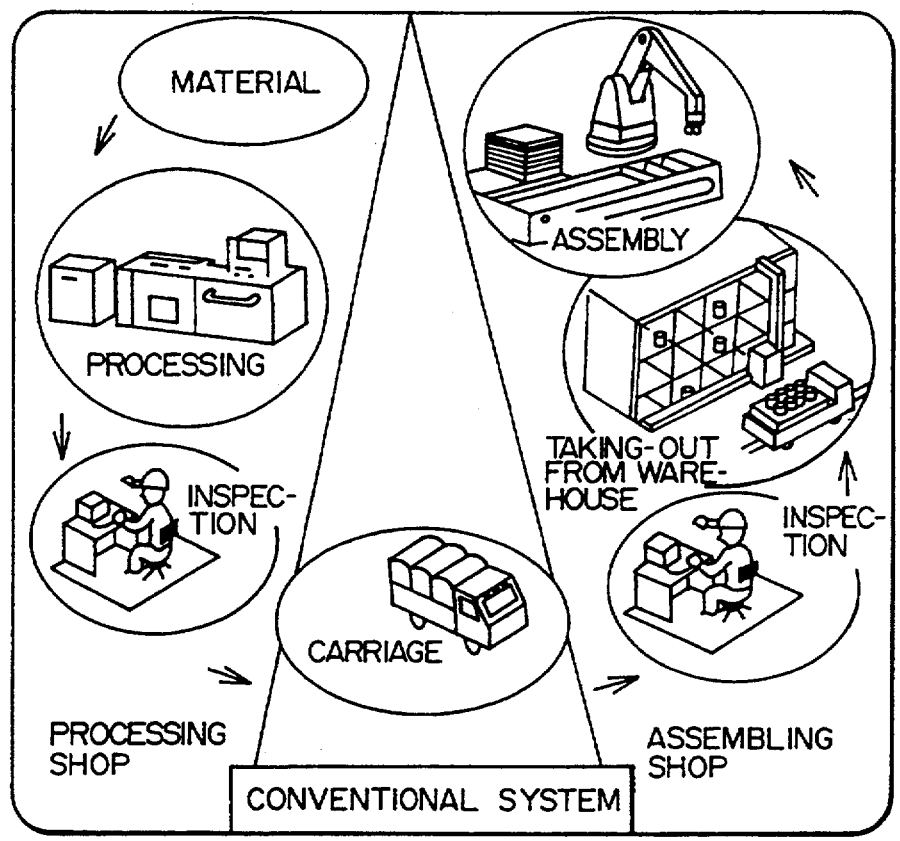
FIG. 1 is a view for explaining the fundamental idea of the invention.
Figure 1:
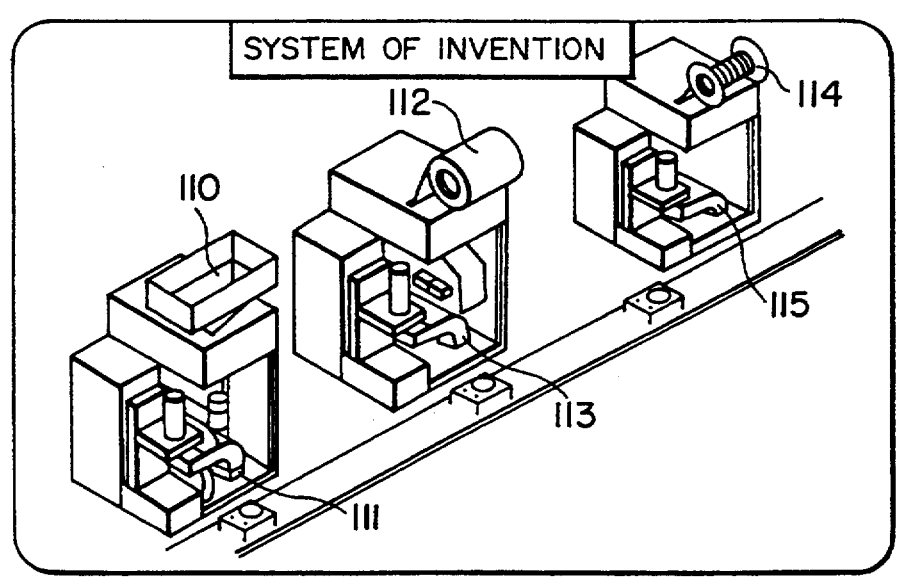
Figure 2:
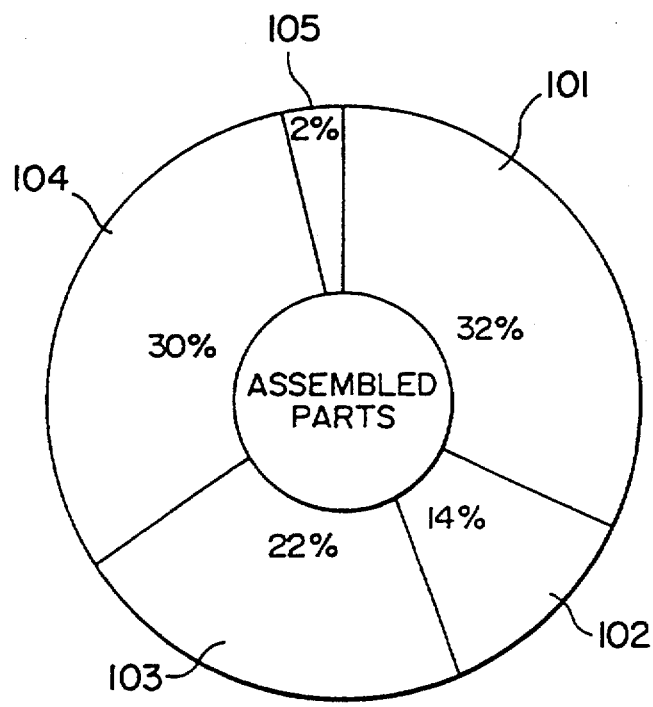
FIG. 2 is an explanatory diagram showing an example of constituent parts of a target product according to the invention.
Figure 3:
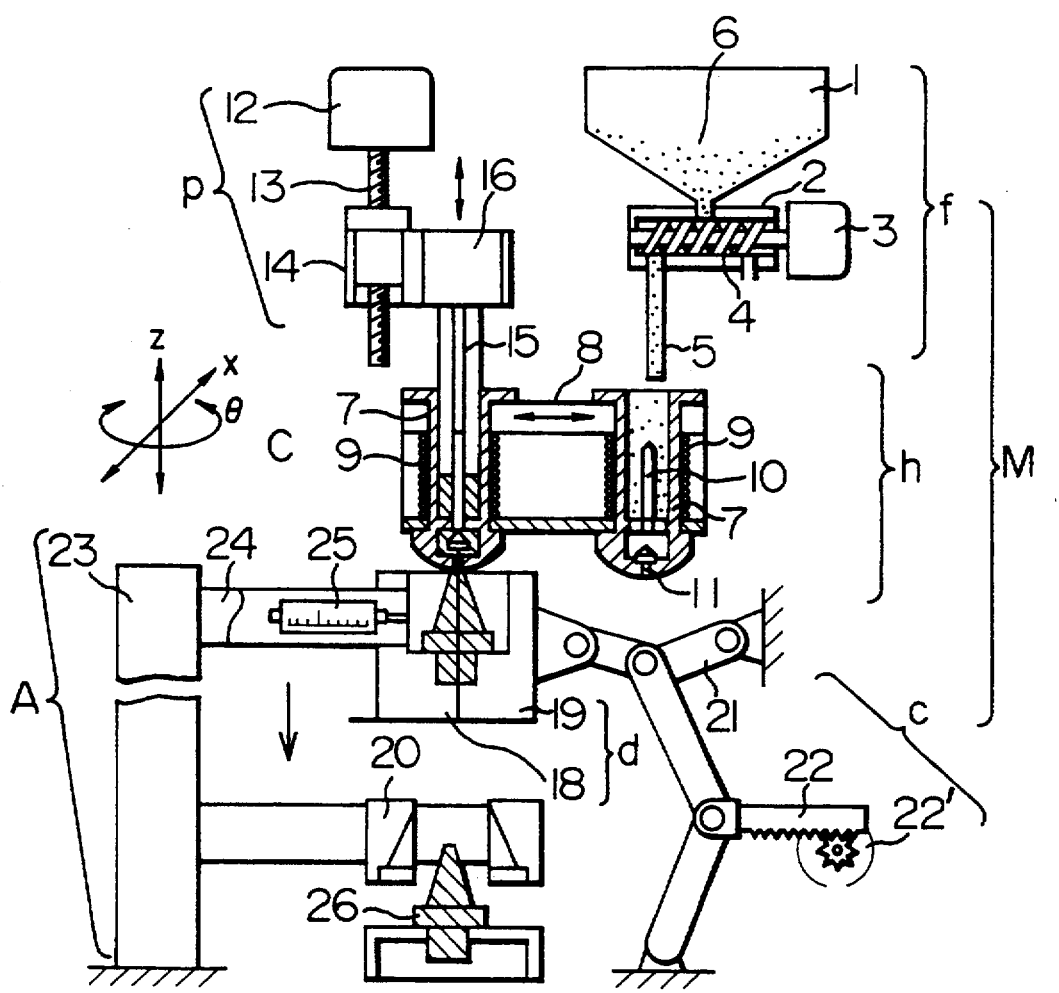
FIG. 3 is a schematic view illustrating the construction of a plastic part oriented processing and assembly integrated unit of the invention.

FIG. 3 is a view showing the construction of a mechanism module of a plastic part oriented processing and assembly integrated unit. This unit is constructed of an injection molding module M, an assembly module A and an inspection module C. Further, the injection molding module M consists of a material feed section f, a heating section h, an extrusion section p, dies d and a clamping section c.

Material Feeding Section f

A pellet feeding for a single unit is required for the reason that molding is intended to be done for every single unit. A hopper 1 is fixed onto a central upper part of a distributing section 2 which is in turn fixed to a mount (not illustrated). Supported in the distributing section 2 is a feed screw 4 which is rotationally driven by a pulse motor 3. Feed pipes 5a, 5b are so mounted at both ends of the distributing section 2 as to be positioned above a heating cylinder 7. A raw pellet 6 stored in the hopper 1 is distributed right and left with forward and reverse rotations of the feeding screw 4 in the distributing section 2, thus feeding the material for single unit. At this moment, a weight of the hopper 1 as a whole is measured by a load cell 80 with a fulcrum 79 serving as a rotational center. A feed quantity of the raw pellet 6 is thus detected. Then, the pellet for a single part is fed to the heating cylinder 7.

Figure 13:
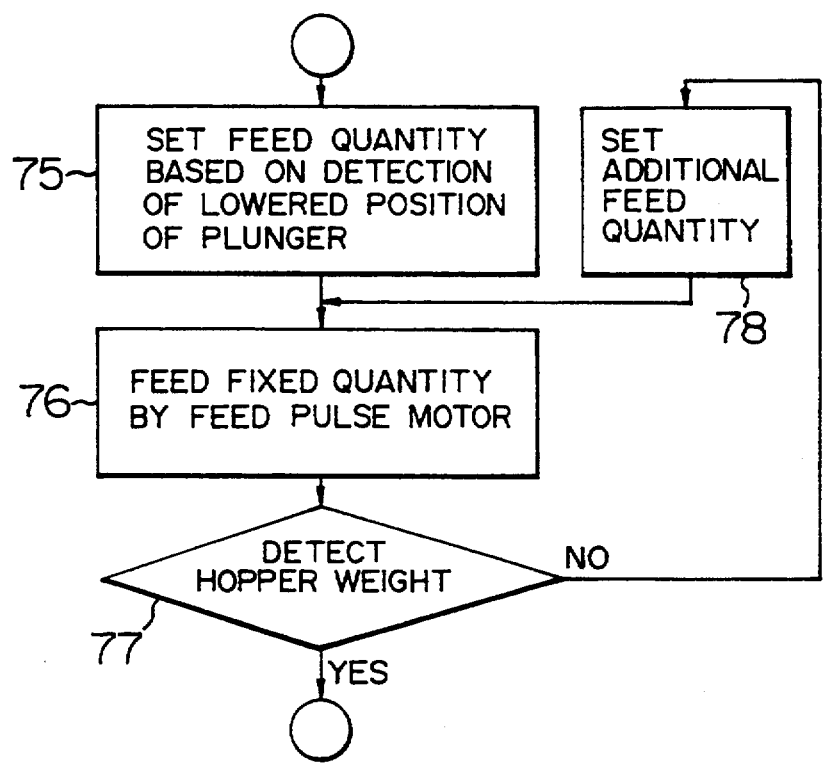
FIG. 13 is a flow chart for explaining a pellet quantitative feeding.

FIG. 13 is a flowchart showing an operation flow by a quantitative feed system for the raw pellet 6. The feeding quantity of a next raw pellet 6 is determined at a step 75 by detecting a descent position of a plunger 15. Based on the information thereof, at a step 86, a rotational amount of the pulse motor 3 for feeding the materials is instructed, and the raw pellet 6 is fed into the heating cylinder 7. Next, the weight of the hopper 1 is detected at a step 77. If a difference between the weights of the hopper 1 and the raw pellet 6 before and after feeding the material is larger than a predetermined value, the following operation is executed. If the difference is less than the predetermined value, the additional raw pellet 6 are further supplied at step 78.

Figures 14A, 14B:
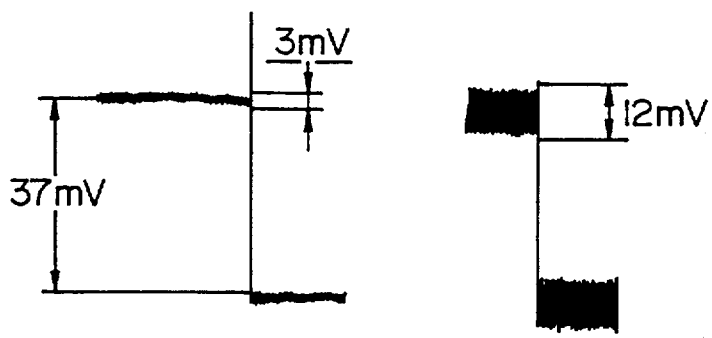
FIGS. 14(a) and (b) are diagrams showing examples of output signals when measuring a pellet mass.

FIGS. 14(a) and (b) show examples of output signals of the load cell 80 when the raw pellet 6 is fed from the hopper 1. FIG. 14(a) shows an example of the signal after the material is fed. FIG. 14(b) shows an example of the signal before the material is fed. The pellet can be fed with accuracy of ±2% from this output difference.

Heating Section h

In principle, the heating cylinder is not of a screw type but of a plunger type to make single unit molding attainable. Two heating cylinders are provided for reducing a tact time. To perform heating for melting the pellet, an induction heating system is used to prevent increases in temperatures of portions other than an injection cylinder.

Referring to FIG. 3, the two heating cylinders 7 are fixed to a heater holder 8 which is mounted on the mount to be horizontally movable light and right. Induction heating coils 9 for melting the resins are wound on the peripheries of the heating cylinders 7. A heating column 10 intended to reduce the heating time, whose function will be described later, is provided to stand uprightly on the central axis of each heating cylinder 7. A heating pin 11 is so fitted at the tip of each heating cylinder 7 as to be slidable up and down, whereby preventing the melted resin from leaking out. This pin is lifted for a certain distance to allow the melted resins 6 to be extruded when each heating cylinder 7 is lowered to contact the dies d. The heater holder 8 moves horizontally and changes cylinder positions to thereby make it possible to feed the raw pellet 6 from the material feeding section f and simultaneously extrude the melted resin.

Figure 15A:
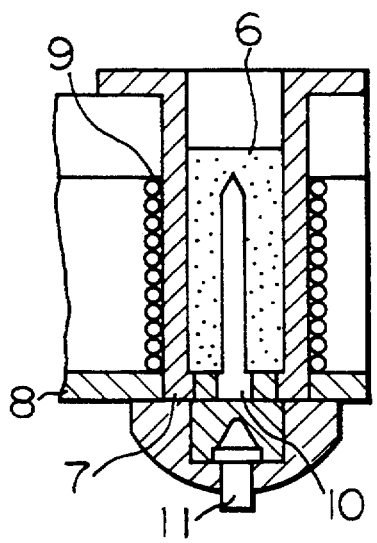
FIGS. 15(a) to (c) are a view and diagrams showing an induction heating system of a heating cylinder.
Figure 15B:
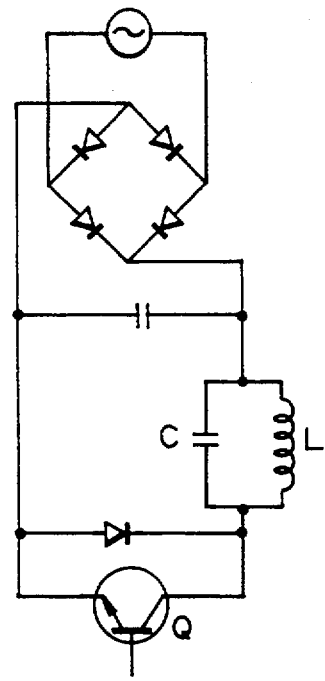
Figure 15C:
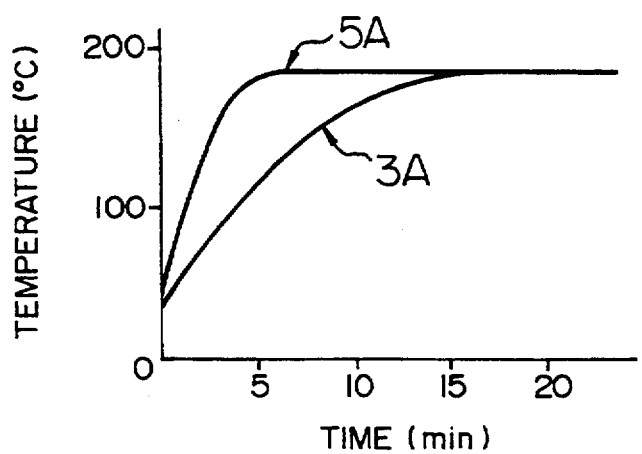

FIGS. 15(a) to (c) are a view and diagrams for explaining the induction heating system for heating the heating cylinder 7. FIG. 15(a) illustrates the mechanical structure of the system. The heating cylinder 7 is fixed to the heater holder 8. The induction heating coil 9 is wound on the periphery of the heating cylinder 7. The heating column 10 stands on the central axis of the heating cylinder 7. The heating pin 11 is so supported at the tip of the heating cylinder as to be slidable up and down. The raw pellet 6 is fed into the heating cylinder 7 and melted.

FIG. 15(b) is the output circuit diagram of this induction heating system. The system is constructed such that, as shown in the figure, a heating coil L and a capacitor C are connected to each other to form a resonance circuit, and a high frequency is generated by turning ON/OFF a transistor Q. More specifically, when turning ON the transistor Q, a heating coil current rises in the forward direction. When turning OFF the transistor Q after a time t has elapsed, accumulative energy in the heating coil L resonates with the capacitor C, and a current flows in the reverse direction. The electric power is controlled by changing the time t during which the transistor Q is kept ON (an ON/OFF total time is the same in this instance.).

FIG. 15(c) shows an example of transition to a set temperature when currents of 3A, 5A respectively flow through the induction heating coil 9. In this case, the set temperature of 180° C. can be reached within 7 min (current of 5A).

Extrusion Section p

In FIG. 3, the extrusion section p is constructed of a stage 14 which moves up and down by a ball screw 13 driven by an AC servo motor 12 which was adopted for decreasing noises and mounted on the mount, and a plunger 15 fixed to the stage 14. The stage 14 has a piezo vibrator 16 attached thereto, which is capable of vibrating the plunger 15 up and down. The raw pellet 6 fed from the material feeding section f is melted by heating for a given time in the heating cylinder 7, and thereafter the resin is extruded into the dies d (see FIG. 18) by lowering the plunger 15 while horizontally moving the heating holder 8 to a position above a die 17.

Dies d

Referring to FIG. 3, the dies d is composed of a stationary or fixed die 18, a movable die 19 and a robot hand 20. The robot hand 20 serves as a portion of an assembly module A. The movable die 19 is adapted to be opened and closed in the bilateral directions by means of a clamping section c.

Figure 7:
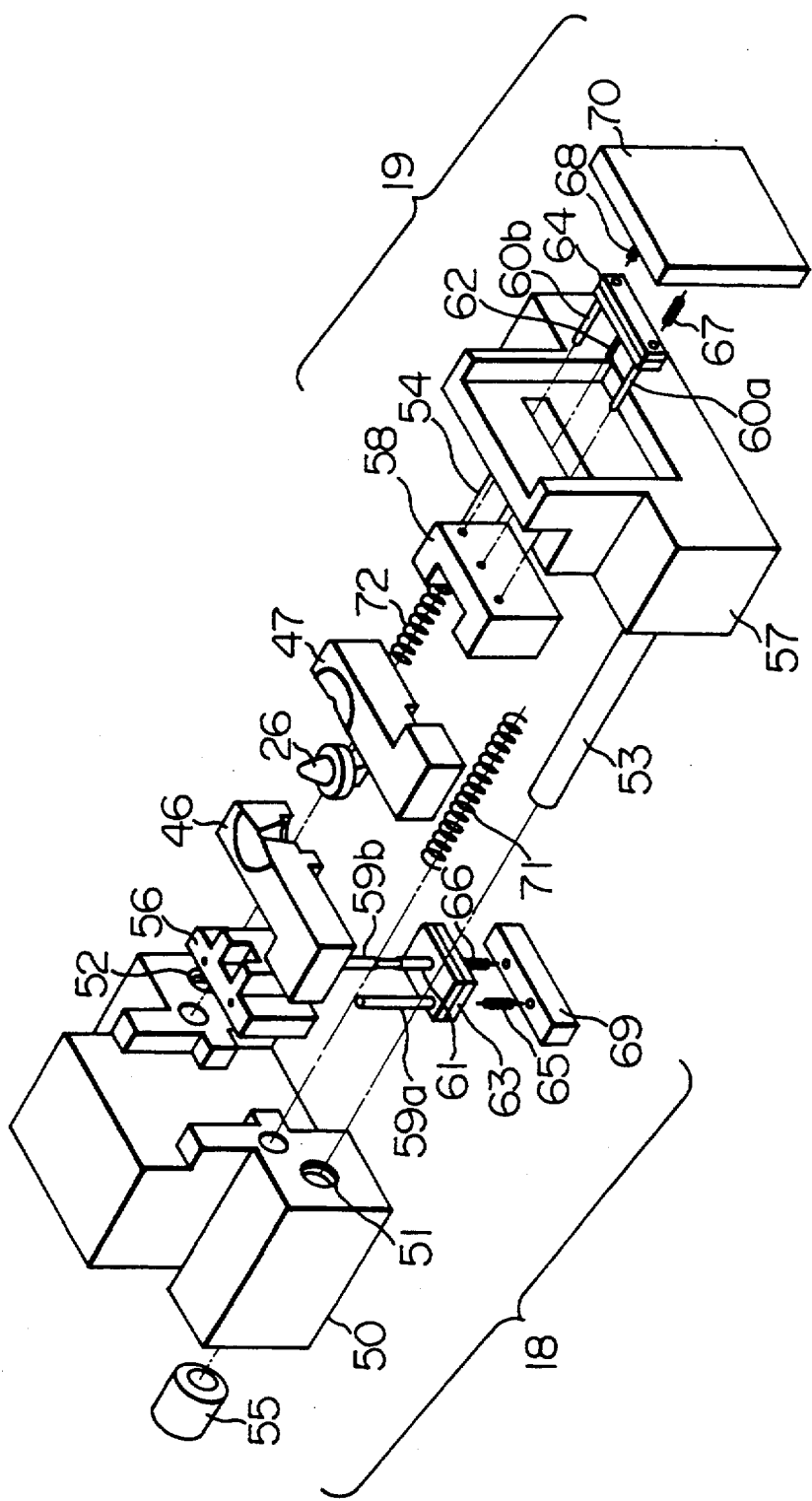
FIG. 7 is an exploded perspective view showing a structural example of dies d.

FIG. 7 is an exploded perspective view illustrating the structure of the dies d. Guide rods 53, 54 are supported via bearing 51, 52 on a fixed die plate 50 which is fixed onto a mount (not illustrated in the figure) so that the rods are horizontally movable. A movable die plate 57 is fixed to one end of the guide rods 53, 54, and a stopper 55 is fixed to the other ends thereof. A core 56 is fixed to the fixed die plate 50, while a core 58 is fixed to the movable die plate 57. Return pins 59 and an ejection pins 61 are so supported on the core 56 as to be slidable in their axial directions, and return pins 60 and an ejection pin 62 are supported on the core 58 in the same manner. The pins 59, 61 and the pins 60, 62 are fixed to ejection plate 63, 64, respectively. The return and ejection pins 59, 61 receive an ejecting force through compression springs 65, 66 from a mounting plate 69 which is fixed to the fixed die plate 50, and the return and ejection pins 60, 62 receive an ejection force through compression spring 67, 68 from a damping plate 70 which is fixed to the movable die plate 57. The fixed die 18 is formed of the fixed die plate 50 and members attached thereto. The movable die 19 is formed of the movable die plate 57 and members attached thereto. Compression springs 71, 72 for generating an opening force are interposed between the fixed die plate 50 and the movable die plate 57. Chucks 46, 47 of the robot hand 20 are inserted into the dies d shown in FIG. 3 by means of an assembly robot 23. Thereafter, the clamping plate 70 is pushed by the clamping section c, thereby closing the movable die plate 57. A cavity for a molded part 26 is formed in combination with the chucks 46, 47 and the cores 56, 58. Further, when the force on the clamping plate 70 is removed, the movable die plate 57 moves to its opening position by the force of the compression springs 71, 72. Two cartridge heaters (not shown) are used for heating the dies, and the temperature thereof is detected by a thermocouple (not illustrated).

Clamping Section c

Referring to FIG. 3, the clamping section c is constructed of a double toggle mechanism 21 the ends of which are respectively supported on the mount and the movable die 19, a rack 22 connected to one point of the double toggle mechanism 21, and a torque motor 22' for moving the rack 22. The double toggle mechanism is adopted with an intention of simplifying the mechanism and reducing the power of a driving source. Clamping is set to be done in the horizontal direction, which accords with such an arrangement that chucking in handling is done in the horizontal direction.

Assembly Module A

The assembly module A serves to assemble the part molded by the injection molding module M to a workpiece which is on a conveyor line presumed in front of this unit. The molded part is, as stated hereinbefore, taken out of the dies and assembled by the robot hand 20 which is fixed to an arm of the assembly module A and constitutes a portion of the dies d during the molding. Hence, it is the principle to arrange the dies such that the molded part is disposed therein with its posture taken during the assembly.

In the assembly module A of FIG. 3, the above-mentioned robot hand 20 is mounted at the tip of the assembly robot 23, which is mounted on the mount and triaxially drives the arm 24, in such a manner that the robot hand is openable and closable. A mass sensor 25 constituting the inspection module C is incorporated in the arm 24. The mass sensor 25 measures masses of the robot hand 20 and the molded part 26 held therein, thus effecting an inspection.

For taking the molded part 26 out of the dies d and assembling the same, the dies are so constructed that a portion of the dies (hereinafter referred to as an intermediate die) including the molded part 26 can be removed, and the taking out and assembling are carried out by means of this intermediate die. More specifically, this intermediate die is fixed to a portion of the assembly module, in other words, the robot hand 20 of the assembly module A is made to constitute a portion of the dies during molding.

Figure 9A:
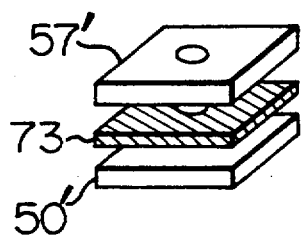
FIGS. 9(a) and (b) are views for explaining the fundamental idea of an intermediate die.

FIGS. 9(a) and (b) show the fundamental idea of the chuck which has also the function of the above-mentioned die. FIG. 9(a) illustrates an arrangement wherein an intermediate die 73 for taking out a molded part by splitting dies in the horizontal (up-and-down) direction is interposed between a movable die 57' and a fixed die 50'. This arrangement is advantageous particularly when completing the assembly simply by pushing or pressing the part. FIG. 9(a) shows another arrangement wherein dies are split in the vertical (right-and-left) direction, which arrangement is advantageous especially when holding and releasing a molded part by opening and closing operations. The details of this arrangement will be described later.

Figure 9B:
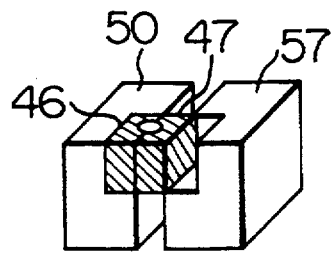
Figure 10A:
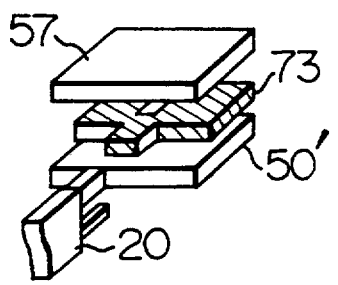
FIGS. 10(a) to (d) are explanatory views illustrating an assembling operation during molding by use of a horizontally split die.
Figure 10B:
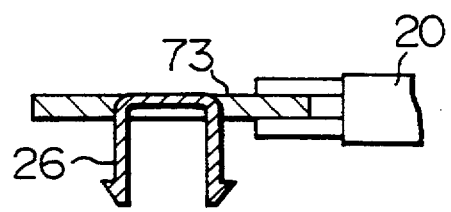
Figure 10C:
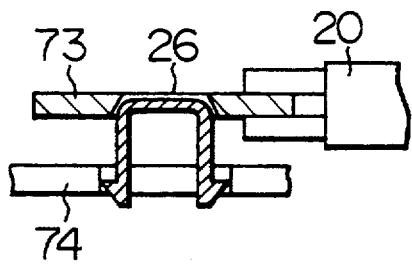
Figure 10D:
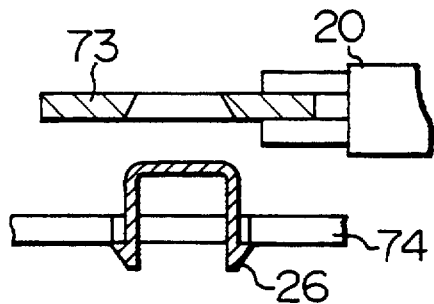
Figure 11A:
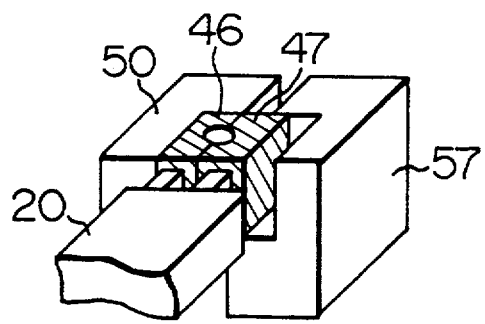
FIGS. 11(a) to (d) are explanatory views showing the assembling operation during molding by use of a vertically split die.
Figure 11B:
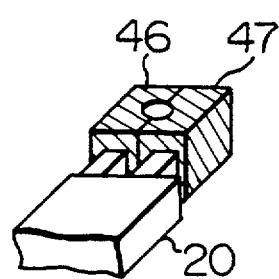
Figure 11C:
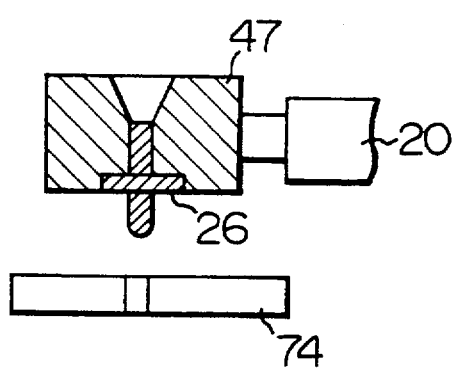
Figure 11D:
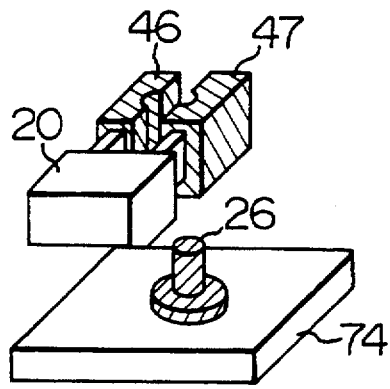
Figure 12:
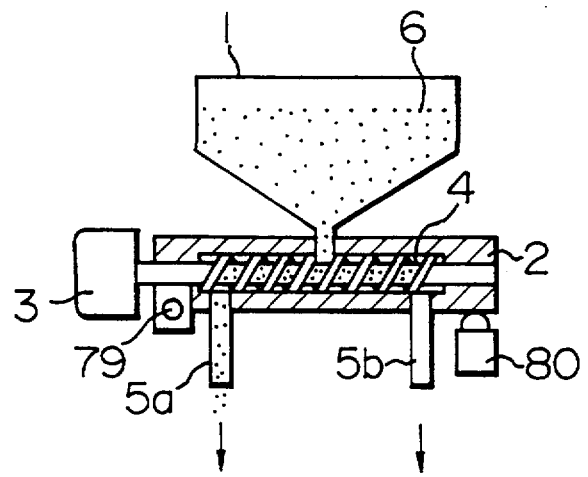
FIG. 12 a view illustrating an example of a pellet feeding mechanism.

FIGS. 10(a) to (d) are views for explaining the operation of the embodiment of FIG. 9(a), and FIGS. 11(a) to (d) are views for explaining the operation of the embodiment of FIG. 9(b). Referring to FIG. 10(a), the robot hand 20 moves the position for grasping the intermediate die 73 immediately after the movable die plate 57' of the dies d has been opened. As illustrated in FIG. 10(b), the intermediate die 73 holds the molded part 26 during handling. Then, the molded part 26 is fixedly inserted in an assembly target workpiece 74 which has been moved to the assembling position by a conveyor (not illustrated) (FIG. 10(c)). Thereafter, the intermediate die 73 is lifted to complete the assembly (FIG. 10(d)). Besides, in FIG. 11(a), the chucks 46, 47 constitute a portion of the robot hand 20. After the movable die plate 57 has been opened, the molded part 26 is carried (FIGS. 11(b) and (c)) and assembled to the workpiece 74 which runs on the conveyor. Thereafter, the chucks 46, 47 are opened to complete the assembly (FIG. 11 (d)).

Figure 8:
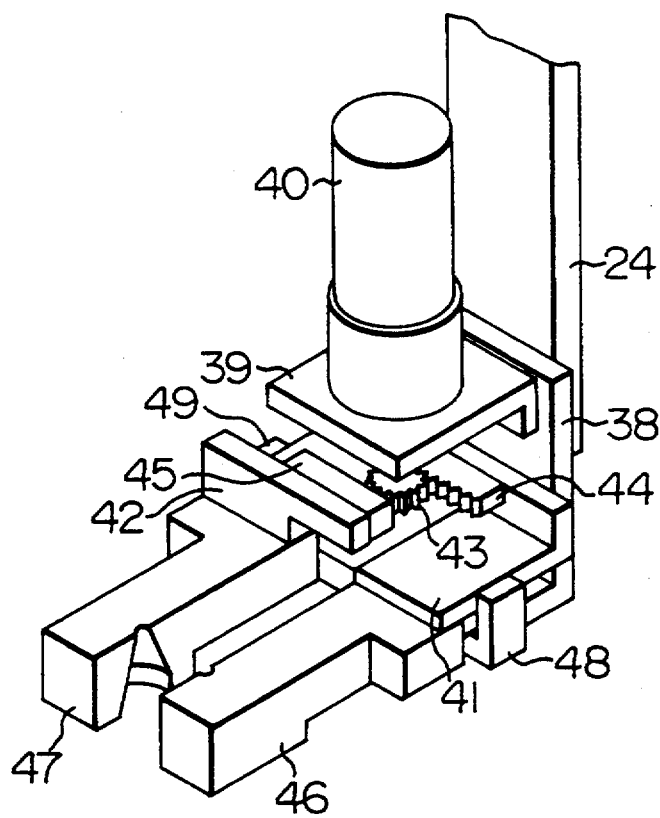
FIG. 8 is a perspective view showing a structural example of a robot hand.

FIG. 8 is a perspective view showing the structure of the robot hand 20, in which the dies of FIG. 9(b) are embodied. A bracket 38 is fitted to the arm 24. Mounted on the bracket 38 are a motor 40 for opening and closing the hand, which is supported on a bracket 39, plates 41, 42 which are so supported by a linear guide (not illustrated) as to be horizontally movable, and stoppers 48, 49. A pinion 43 is fixed to the motor 40, while racks 44, 45 and the chucks 46, 47 are fixed respectively to the plates 41, 42. The chucks 46, 47 are opened and closed when motor 40 is activated.

Inspection Module C

Quality of the molding is judged through measurement of mass. In view of efficiency and accuracy, this measurement of the mass is desired to be conducted while grasping the part. Accordingly, it is necessary to measure the mass of the part inclusive of the masses of the intermediate die 73 and a portion of the robot hand 20. Then, when the mass of the molded part is measured by 1% charge of weight, a measurement accuracy ratio of $5 \times 10^6$ is required. For this reason, an electromagnetic force balanced type mass measuring system was adopted.

Figure 16:
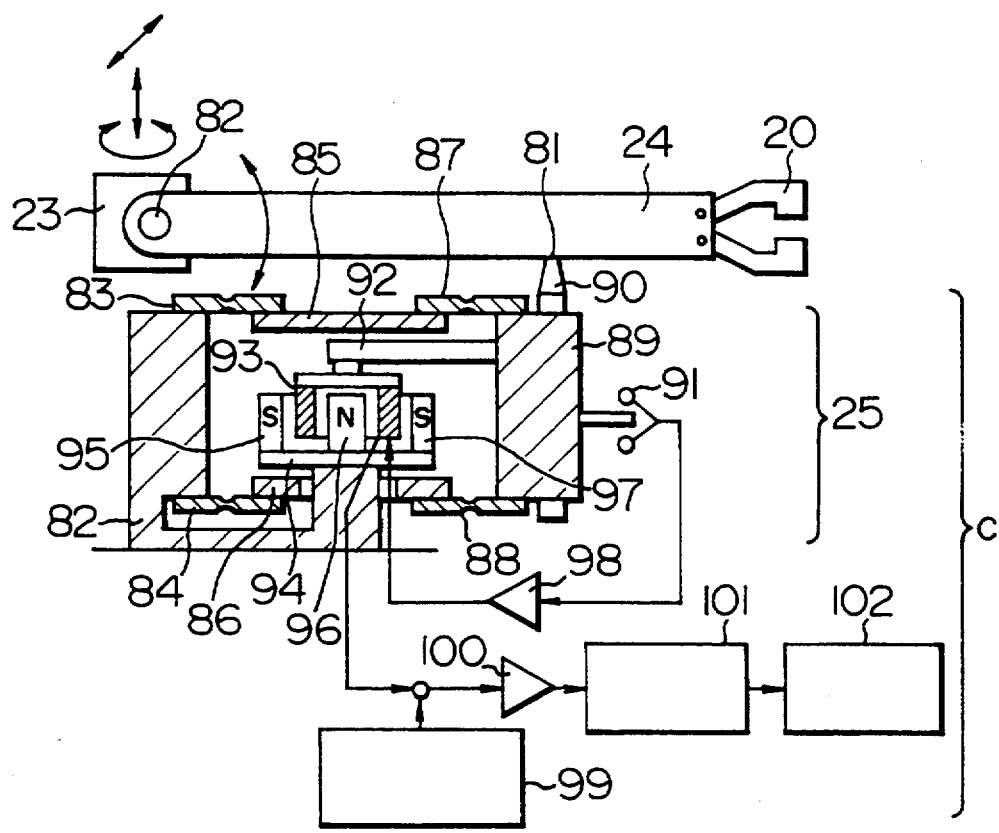
FIG. 16 is a sectional view showing a constructive example of an inspection module.

FIG. 16 is a sectional view illustrating the construction of the inspection module C. At an application point 81, the mass sensor 25 receives a mass of the arm 24 which is driven by the assembly robot 23 fixed to the mount, is so supported at a fulcrum 82 as to be capable of oscillation and has the robot hand 20 mounted at its tip. The mass sensor 25 has a base 82 secured to a mount and middle members 85, 86 mounted via elastic fulcrums 83, 84 on the base 82. A movable frame 89 is attached to the middle members 85, 86 through elastic fulcrums 87, 88. The base 82, the elastic fulcrums 83, 84, 87, 88, the middle members 85, 86 and the movable frame 89 constitute a parallel link. Fixed to the movable frame 89 are a rod 90 having an application point 81, a displacement sensor 91 and a coil support plate 92. A coil 93 is secured to one end of the coil support plate 92 to be positioned between magnets 95, 96, 91 with a slight gap left therefrom. These magnets are attached onto a magnet plate 94 which is fixed to the base 82. When the mass of the arm 24 is on the application point 81, the movable frame 89 is lowered, and the displacement sensor 91 generates a voltage signal corresponding to a movement of the movable frame 89. This signal is amplified and converted by an amplifier 98, and a voltage is applied so that the coil 93 exerts a reaction force equivalent to the mass of the arm 24. A current I flowing through the coil 93 at this moment is outputted for detection. In a control circuit, the current I is compared with an output value at an original point where this current I is determined by a O-point adjustment 99, i.e., in a non-load state, and a difference is amplified by an amplifier 100. The difference thereafter undergoes an AD conversion 101 and is taken in a control unit 102, thereby measuring the mass of the molded part 26 grasped by the robot hand 20 and the arm 24.

Heating Column in Injection Molding Module M

FIG. 17(a) is a diagram showing a simulation of changes in temperature of the raw pellet 6 according to a finite element method in the case of providing no heating column 10. The axis of ordinate in this diagram indicates the temperature, while the axis of abscissa indicates the time. The mark represents a solid state of the raw pellet 6, while o represents a liquid state. Shown therein are transitions of temperature at four points a, b, c, d (the point a is on the central axis of the heating cylinder 7, and subsequently the points b, c, d become closer and closer to the inner surface of the heating cylinder 7). When the temperature rises from the outer periphery and reaches the melting point, the temperature rise stops due to a melting heat absorption. Then, upon completion of the change of phase, the temperature starts increasing again, and the increase advances in the order of d→c→b→a. That is, the central point is melted latest, and much time is required so far. As a solution for this problem, it can be thought of that a column as shown in FIG. 3 is provided at the center to eliminate the necessity for melting the material at the center and, simultaneously, heating is effected also by this column. FIG. 17(b) illustrates a state where the above-described heating column 10 is added. The points a to c are situated in this order from an outer wall of the heating column 10 to an inner wall of the heating cylinder 7. Judging from these simulations, if the heating column 10 is not provided, it takes 220 seconds to melt the raw pellet 6 up to the center of the heating cylinder 7, whereas, if the heating column 10 is added as in FIG. 17(b), the time is remarkably reduced down to 40 seconds.

Application of Vibrations in Ejection Molding Module M

There is a report that when applying vibrations to melted high polymers, fluidity thereof during molding increases owing to eddies which are caused in the vicinity of the wall of a flow path by the vibrations, and a necessary pressure is decreased to reduce the required energy (N. Bassow: Theoretische Grundlagen des Formfullvorgangs beim Spritzgiesses unter Anwendung niederfrequenter Schwingungen grosser Amplitude: Plaste Kautschuk, vol. 29 No. 9 pp. 524–526 (1982)). It is supposed that this measure will enable a reduction in rigidity of equipments to thereby make them compact in size, and this molding module is so constructed as to apply vibrations during injection.

Figure 18:
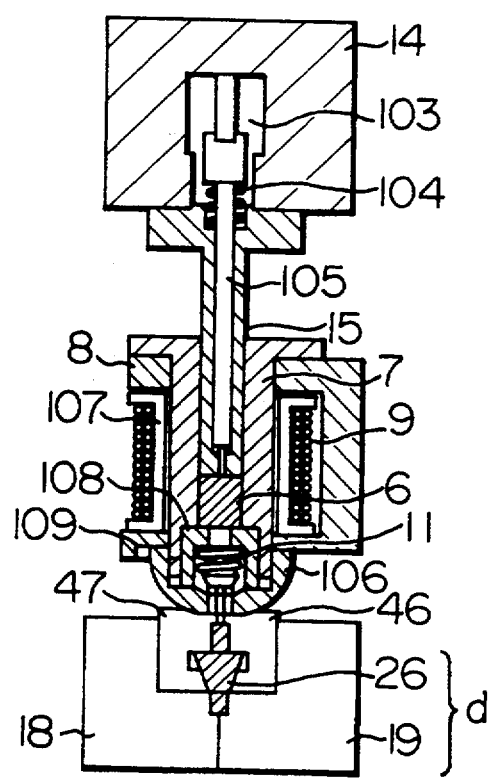
FIG. 18 is a sectional view for explaining a vibration applying mechanism.

FIG. 18 is a sectional view of a vibration applying mechanism. The plunger 15 is fixed to the stage 14 which is vertically movable with the aid of a ball screw (not illustrated). A vibrator 105 is coaxially supported in the plunger 15 to be vertically slidable. The vibrator 105 is vibrated up and down by means of a laminated piezo element 103 and a compression spring 104. Just under this plunger 15, the heating cylinder 7 is fastened to a heating cap 106 with screws to be fixedly secured to the heating holder 8 which is mounted on the mount and movable up and down. The heating pin 11 is so supported on the heating cap 106 as to be movable up and down. When the plunger 15 is lowered to depress the heating holder 8, the heating pin 11 is pushed up by the dies d, to eject the melted resins 6 into the dies d. Further, when the plunger 15 is lifted to separate the heater holder 8 from the dies d, the heating pin is depressed by a restoring force of a compression spring 109 that contacts a spring support 108. An outflow of the melted resins 6 is thereby stopped. As described hereinbefore, the dies d are composed of the chucks 46, 47 of the robot hand 20, the fixed die 18 and the movable die 19. A voltage is applied to the laminated piezo element 103 when the plunger 15 is lowered, and is cut off when the plunger is lifted. As the result of a test, it has been found that vibrations of 100 Hz through 500 Hz are effective.

Control Module

Figure 4:
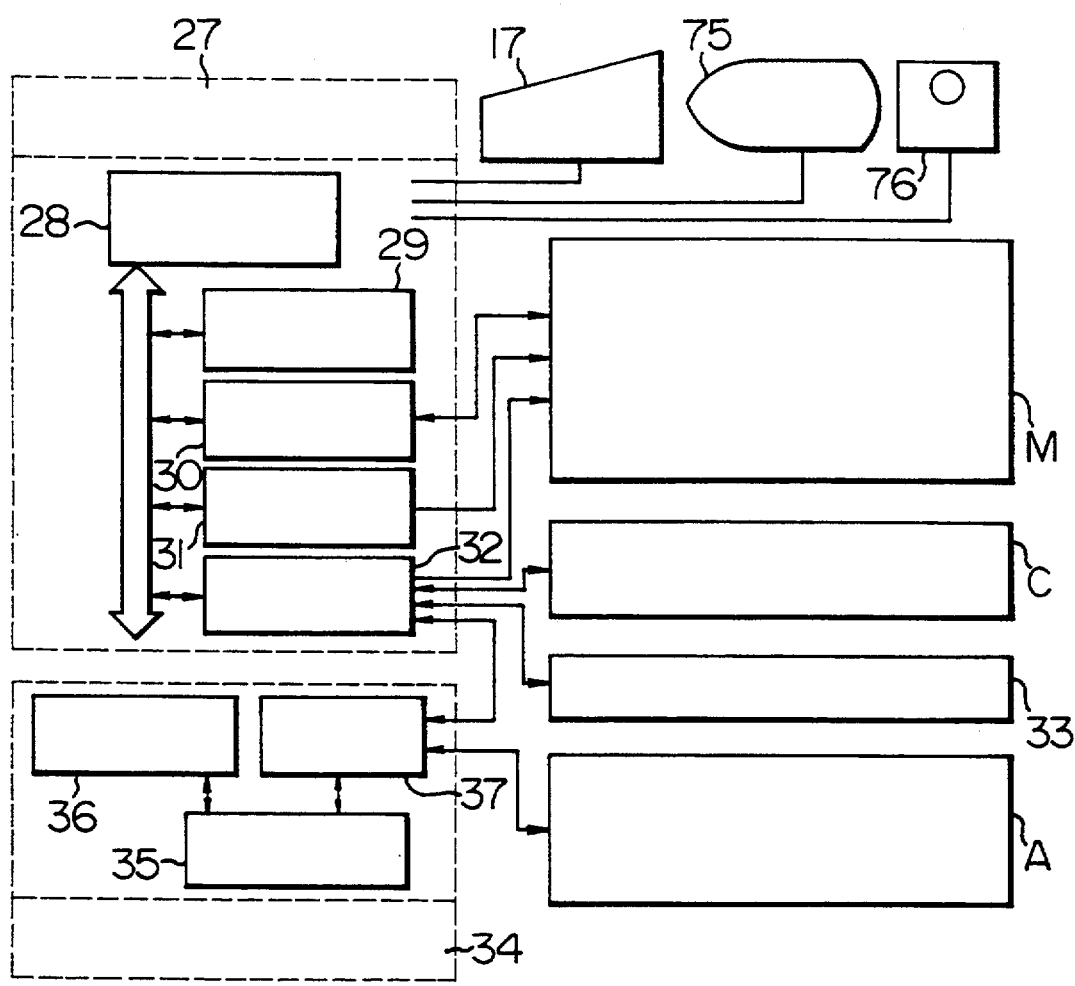
FIG. 4 is an explanatory block diagram illustrating the construction of a control module in an embodiment of the invention.

FIG. 4 is a block diagram of the control module in this embodiment. This module includes a computer 27 to which outwardly connected are a keyboard 17, a CRT 75 and an FDD 76 the computer 27 has a 16-bit CPU 28, and a memory board 29, a pulse motor control board 30, an A/D converting board 31 and an I/O board 32 are incorporated in the computer to be connected to the injection molding module M and the inspection module C. Operating states are displayed on a display 33. The computer 27 is capable of communicating with a robot controller 34 for controlling the assembly robot 23. In the robot controller 34, a memory 36 and an I/O 37 are connected to a 16-bit CPU 35.

Figure 5:
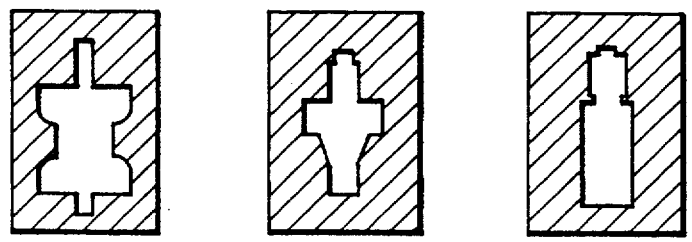
FIG. 5 is a view showing examples of molding target parts according to the invention.
Figure 6:
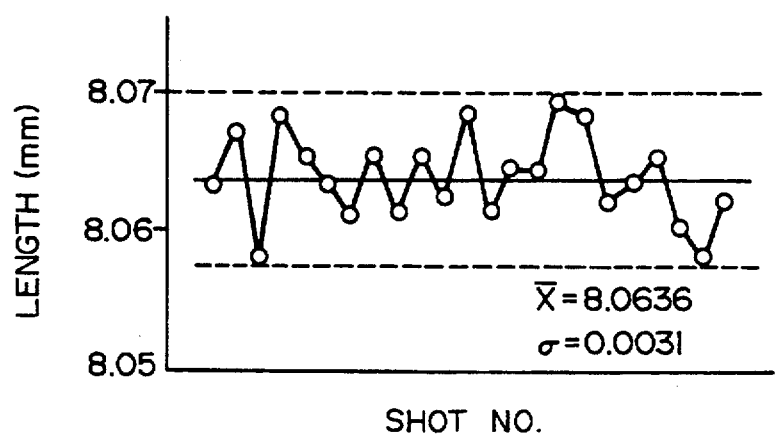
FIG. 6 is a diagram showing an example of dispertion in sizes of molded parts.

FIG. 5 illustrates examples of molded parts in this embodiment in the case where a polyacetal resin is used for the parts. FIG. 6 shows an example of dispertion in sizes of the parts molded in this unit, wherein the axis of abscissa indicates the shot numbers, while the axis of coordinate indicates the sizes.

Figure 19:
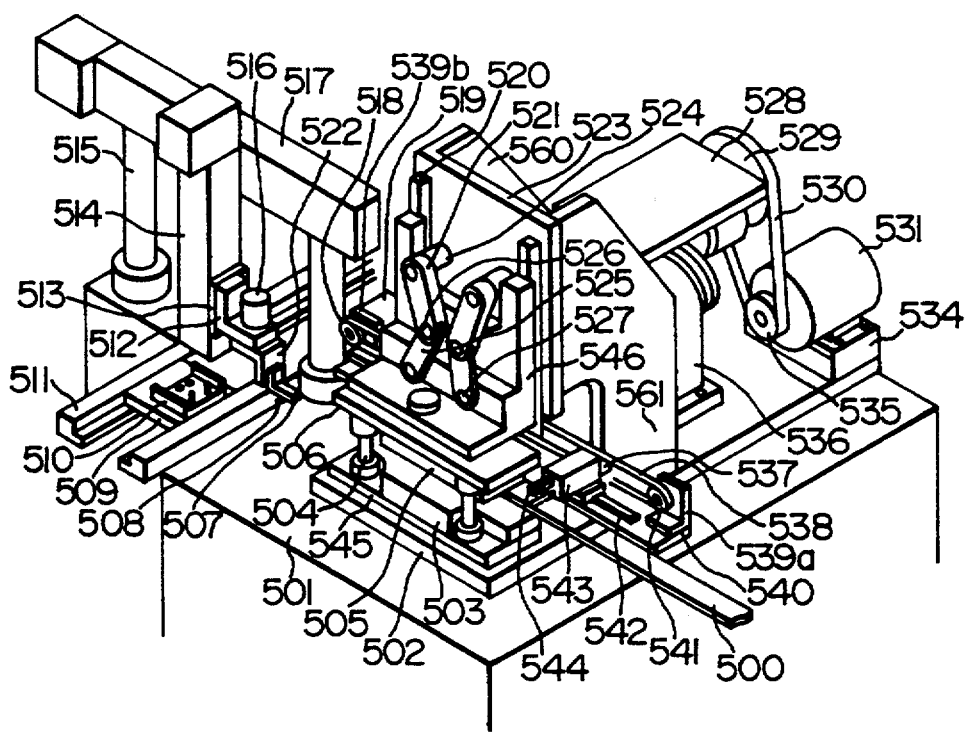
FIG. 19 is a perspective view for explanation of a pressed part oriented processing and assembly integrated unit of the invention.

Next, an embodiment of a press part oriented working and assembly combined unit will be described with reference to FIGS. 19 to 25. FIG. 19 is a perspective view illustrating the working and assembly combined unit in which a material (hoop material) is fed to press dies to be subjected to a press working and then due worked part is taken out of the dies and assembled.

Figure 20:
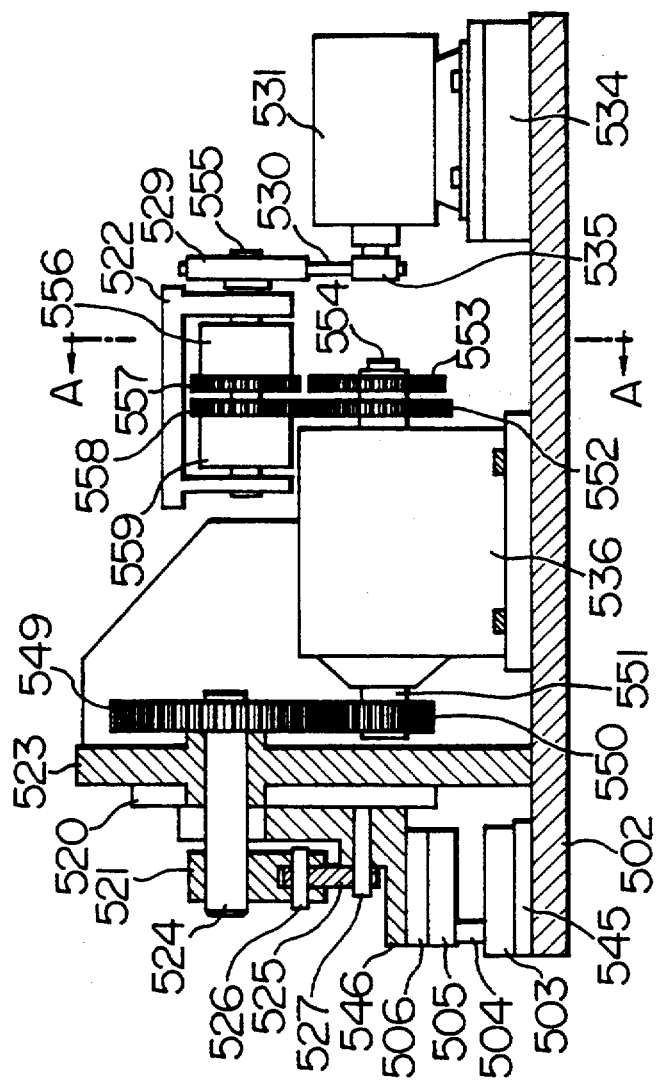
FIG. 20 is a sectional view illustrating a pressed unit module of FIG. 19.

The press body is fixed onto a mount 501. In the press body, side plates 560, 561 are fixedly attached to a base plate 502. A plate 523 is fixedly secured to the other ends of the side plates 560, 561. A rail 520 is fixed to the front surface of the plate 523. A ram plate 546 is slidably mounted onto the rail 520. FIG. 20 shows a sectional view of the above-described unit. Referring to FIG. 20, a gear 549 is fixed to one end of a shaft 524 which is rotatably supported by the plate 523. Engaged with the gear 549 is a gear 550 which is fixed to an output shaft 551 of a speed reducer 536 mounted on the base plate 502. Gears 552, 553 are fixed to an input shaft 554 of the speed reducer 536. A shaft 555 is rotatably supported by a bracket 528 which is fixed to the side plate 560. Clutches 556, 559 are rotatably supported on the shaft 555. A gear 557 is rotatably supported by the clutch 556, while a gear 558 is rotatably supported by the clutch 559. The gear 558 meshes with the gear 552, and the gear 557 meshes with the gear 553 through an idler gear 548. Further, a pulley 529 is fixed to the other end of the shaft 555. The pulley 529 is connected via a belt 530 to a pulley 535 which is fixed to the output shaft of a motor 531.

The motor 531 is mounted on a base 534 fixed to the base plate 502. On the other hand, a lever 521 is fixed to the other end of the shaft 524. A level 525 is rotatably attached with a pin 526 to the other end of the lever 521. The other end of the lever 525 is rotatably connected to a pin 527 fixed to the ram plate 546. A plate 545 for a die set is fixed onto the base plate 502. An upper plate 506 for the die set is fixed to the lower surface of the ram plate 546. A bottom die 503 is fixed to the plate 545, and a top die 505 is fixed to an upper plate 506, while they are guided by guide posts 504.

Subsequently, a mechanism for feeding the hoop material will be described. Referring to FIG. 19, brackets 539a, 539b are fixed to the plate 540 which is fixed to the base plate 502. Fixed to the bracket 539b is a pulse motor 519 which has a pulley 518 fixed to its motor shaft. A pulley 541 is rotatably supported by the bracket 539a. A block 537 is slidably mounted on a rail 542 fixed to the plate 540. An air chuck 543 is attached to the block 537. Besides, the pulley 518 is connected through a belt 538 to the pulley 541. The belt 538 is connected to a portion of the block 537.

Figure 21:
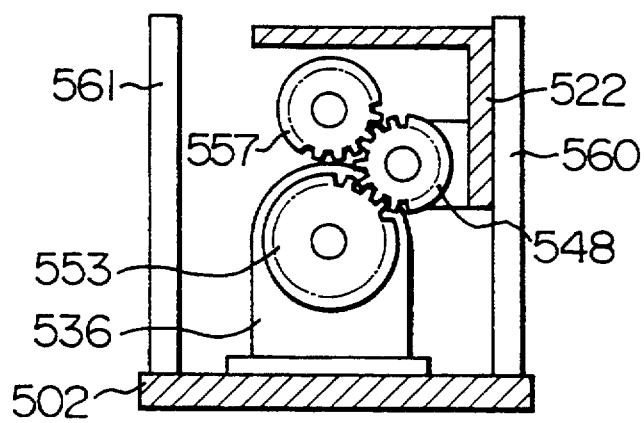
FIG. 21 is a sectional view taken along the line A—A of FIG. 20.

The operation of the thus constructed press body will be described below. Rotation of the motor 531 is transmitted via the pulleys 535, 529 and the belt 530 to the shaft 555. When the clutch 559 is electrically excited, the gear 558 rotates, and the shaft 524 rotates through the speed reducer 536. The ram plate 546 is thereby lowered through the levers 521, 525. After the hoop material 500 has been set at a predetermined position on the bottom die 503, the ram plate 546 is lowered for a predetermined distance, and the hoop material is processed in a predetermined shape. Feeding of the hoop material carried out with the aid of the pulse motor 519. When the pulse motor 519 is rotated by a predetermined amount in a state that the hoop material 500 is caught by chuck pawls 544, the belt 538 is moved through the pulley 518, and the air chuck 543 is moved by the block 537 connected to the belt 538. Thus, a predetermined quantity of the hoop material 500 is fed into the dies. When the ram plate 546 is to be lifted, the activation of the clutch 559 is turned off, whereas the clutch 556 is electrically activated to rotate the gear 557. Referring to FIG. 21, the rotation of the gear 557 is transmitted via the idler gear 548 to the gear 553. When the raw plate 546 is to be lowered, the input shaft 554 of the speed reducer is rotated by the gear 552 and the gear 558. If the rotation is clockwise, the input shaft 554 of the speed reducer is rotated through the idler gear 548 described above in an excited state of the clutch 556. The rotating direction is therefore counterclockwise. The ram plate 546 is thereby lifted. Namely, the lifting and lowering operations of the ram plate 546 are changed over by alternately electrically turning on or off the two clutches 559, 556.

Given next is a description of how the processed part is taken out of the dies and assembled. Referring to FIG. 19, an X-shaft 517 is attached to a support pillar 515 which is fixed to the mount 501. A Z-shaft 514 is slidably supported by the X-shaft 517. A plate 513 is so secured to the Z-shaft 514 as to be movable up and down. The X-shaft 517 and the Z-shaft 514 serve as a biaxial orthogonal robot and are moved respectively by pulse motors. A bracket 512 is fixed to the plate 513 on the Z-shaft. A rotary actuator 516 is secured to the bracket 512. An L-plate 522 is rotatably secured to a rotary shaft of the rotary actuator 516. An adsorptive plate 507 is fixed to the L-plate 522.

Figure 22:
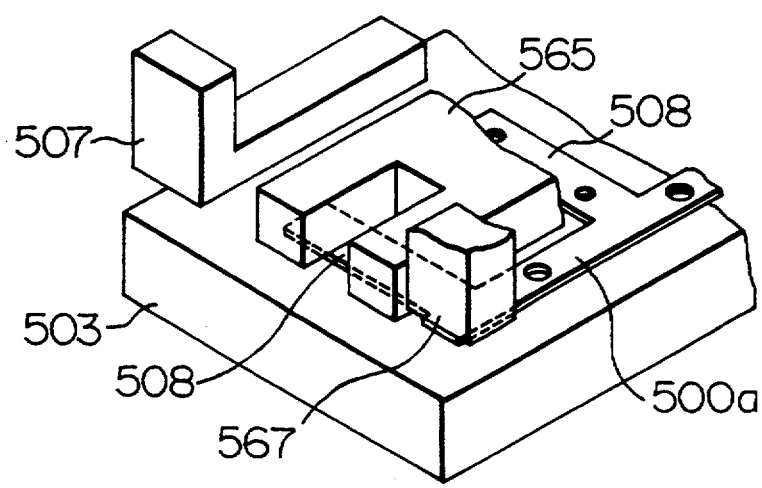
FIG. 22 is a view for explanation of a final process of the workpiece in the dies.
Figure 23:
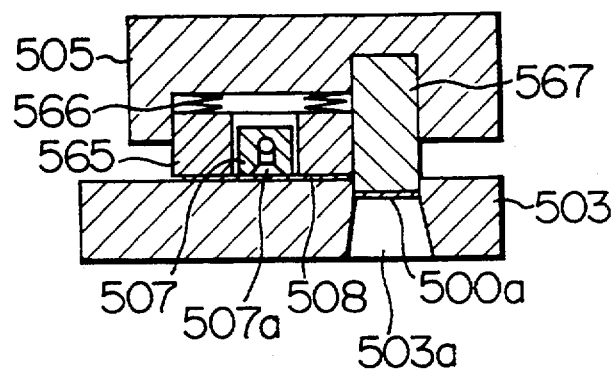
FIG. 23 is an explanatory view showing one step of a pressing operation.
Figure 24:
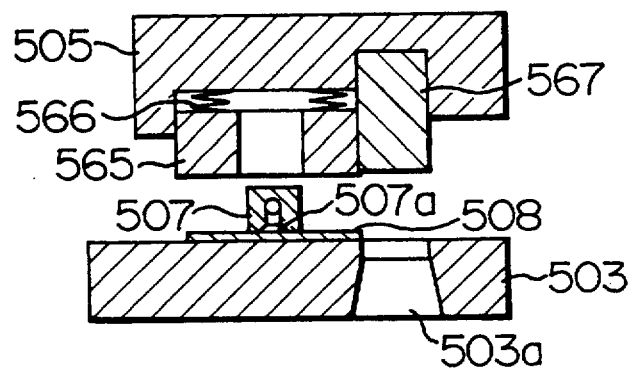
FIG. 24 is an explanatory view showing another step of the pressing operation.
Figure 25:
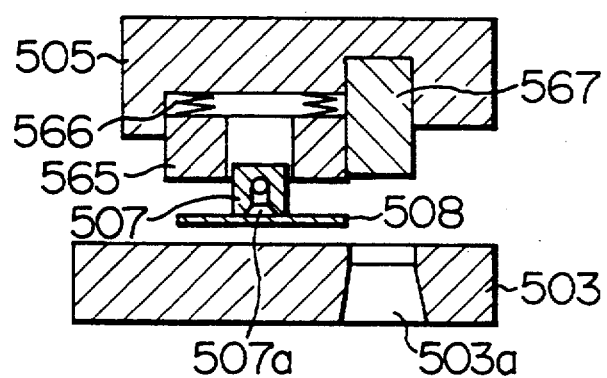
FIG. 25 is an explanatory view showing still another step of the pressing operation.

Next, FIG. 22 illustrates the final stage in the process of working the part within the dies. A workpiece 508 formed by working the hoop material 500 in the predetermined shape within the dies is cut off by a punch 567 from a hoop material connecting section 500a when the top die 505 is lifted in the final stage of the process within the dies. At this time, the workpiece 508 is pressed down by a stripper plate 565. In this state, the adsorptive plate 507 is moved by the orthogonal robot to a position at which it can hold the workpiece 508 by absorption (FIG. 23). Subsequently, the top die 505 is lifted (FIG. 24). At this moment, the stripper plate 565 is also lifted together with the top die 505. Then, the adsorptive plate 507 holds the workpiece 508 and is lifted to such an extent that the workpiece 508 separates from the bottom die 503. The holding of the workpiece 508 (FIG. 25) is performed by means of vacuum suction through an adsorptive hole 507a which is connected to a vacuum pump (not shown) or the like. Thereafter, the workpiece 508 is moved up to the upper portion of a jig 509 on a conveyor 511 by means of the X-shaft 517. The workpiece 508 is assembled to a certain portion of a frame 510 that is a target part to which the workpiece be assembled. In the case of the workpiece described above, for instance, the assembling operation is performed such that a hole of the workpiece 508 is fitted onto a pin or the like of the target part (frame 510) from above, the vacuum suction is turned off in this state and the adsorptive plate 507 is moved upwardly. As described so far, the present unit makes it possible to feed the hoop material 500 into the dies, work the same in the predetermined shape with the up-and-down motions of the press, then take out the worked part directly from the dies by means of the robot, hand the part to the assembling position and assemble it to the target part.

Figure 26:
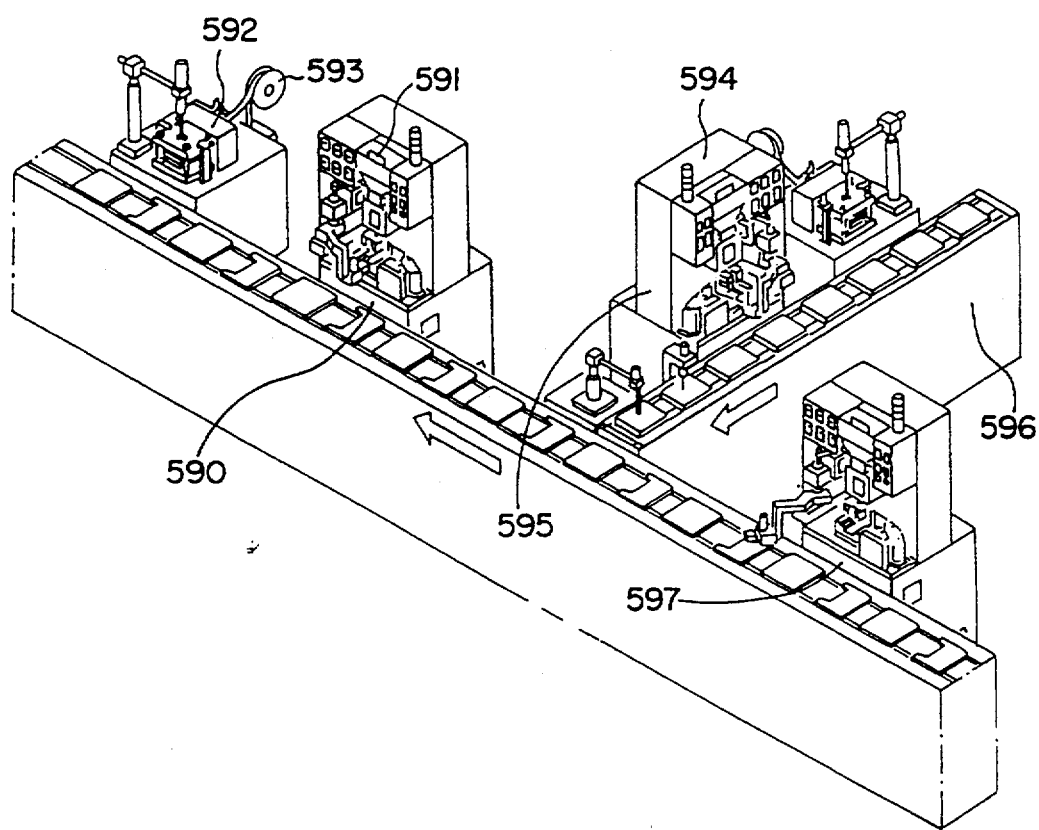
FIG. 26 is a view illustrating one example of an appearance of a production system according to the invention.
Figure 27:
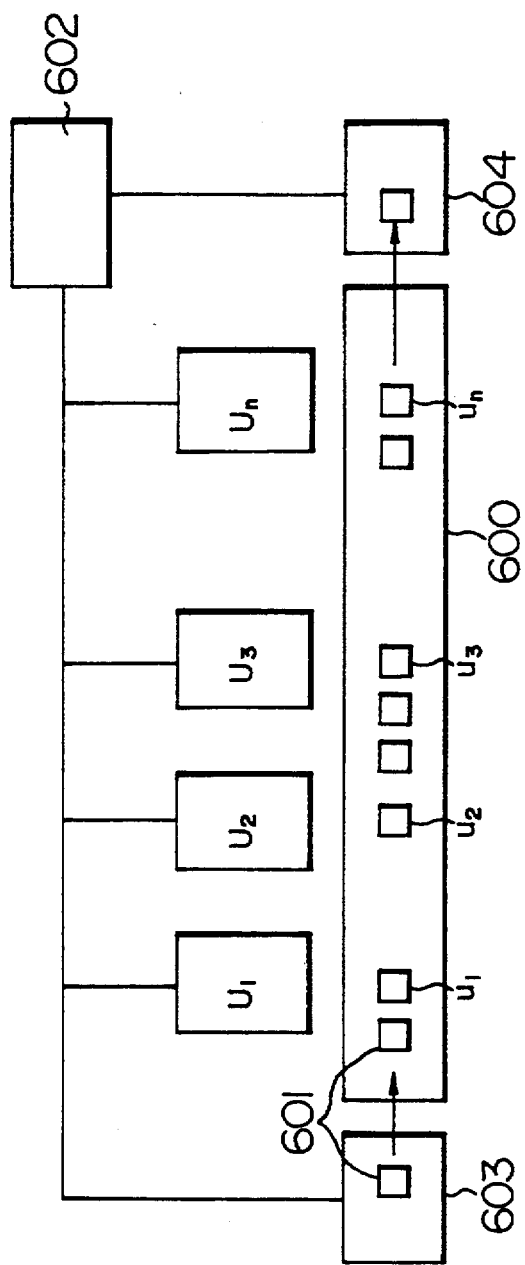
FIG. 27 is an explanatory view illustrating a control system of the production system according to the invention.

Next, description will be made on a control method for a production line comprising the processing and assembly integrated units. FIG. 26 is a schematic view showing the appearance of an example of a production line which is constituted by a plastic part oriented processing and assembly integrated unit, a pressed part oriented processing and assembly integrated unit and a similar processing and assembly combined unit. FIG. 27 is a view illustrating a control system of the production line formed by the processing and assembly integrated units U1, U2, . . . Un. The control system consists of these respective units U1, U2, . . . Un, a so-called free flow conveyor 600 for carrying base parts 601 for assembly, a throw-in section 603, a discharge section 604 and a production line control device 602. The base parts 601 for assembly are transferred onto a platen (not shown) which moves asynchronously on the free flow conveyor 600 from the throw-in section 603. These base parts are moved to locating positions u1, u2, . . . un which correspond to the units U1, U2, . . . Un, respectively. The base parts 601 are then subjected to assembling and transferred to the discharge section 604.

In FIG. 27 of the production line using the free flow conveyor, when the base parts 601 for assembly come to the positions ui, u2, . . . un, the respective processing and assembly integrated units start their processing and assembling operations. It is required for the individual units to cope with intermittent operations. In the plastic part oriented unit involving a thermal process, during a stopping period longer than a constant time (e.g., approximately 30 min), the temperature of the resin to be fused is modified to a value which exceeds the melting point slightly (5°–15° C.), thus coping with the intermittent operation.

Supply of the raw material such as pellets, a hoop material, etc. to the respective units of the production line is done in the following member. To start with, the production line control device 602 is instructed to compute and output supply of the raw material within a accommodation limit of each unit in accordance with the memorized numbers of products to be produced. During operation of the production line, a prospective number of products to be produced from this time on in each unit is computed from the number having been processed in the unit and the total number of products to be produced therein. Simultaneously, a quantity of the raw material to be resupplied and a timing thereof are computed and outputted. In the plastic part oriented processing and assembly integrated unit, in case the quantity of pellets corresponding to the prospective number to be processed from now on is less than a pellet accommodation quantity of one heating cylinder, instructions are given to supply the material of only the necessary quantity for the subsequent process to the heating cylinder.

In the production line comprising the processing and assembly integrated units, since the processed parts are not inspected in off-line, it is required that 100% non-void parts be secured at the processing stage in each unit, or alternatively defective parts be surely eliminated by the inspection. To secure the non-void parts, according to the invention, performed by respective intra-unit control devices are control of the processing conditions, i.e., the control of an injection speed, an injection pressure, a temperature, etc. in the plastic part oriented processing and assembly integrated unit and the force control per processing in the pressed part oriented processing and assembly integrated unit. Further, as inspection for securing the non-void parts, the above-mentioned processing conditions are monitored to detect any abnormality, and masses of the parts are measured.

When assembling the processed part to the base part 601 for assembly, it is necessary for teaching of the operation to clearly know, the mutual positional relation between them. To this end, the processed part is taken directly from the molding or punching dies, or the position of the part having been worked is held by the combined use of the dies and the robot hand. Simultaneously, the base part 601 for assembly is located in the constant positions with respect to the processing and assembly integrated unit—i.e., the base part 601 for assembly and the worked mold part taken out of the dies are arranged in the same coordinate system, thereby making the relative positional relation clear and facilitating the teaching of the operation.

Changes in type of products to be produced are coped with as follows. The production line control device 602 is previously inputted with data for every type of products, which concern dies, a raw material and working process conditions for the parts to be processed and assembled by the respective processing and assembly integrated units as well as necessary positions for handling the parts. When the type of products is changed, the device 602 outputs the indication that the raw material and the dies should be replaced. Then, the device 602 outputs corresponding processing conditions and positional data necessary for handling parts to the control module of each processing and assembly integrated unit.

As described above, in the production line constituted by the units wherein processing and assembling are integrated, a necessary quantity of a raw material is supplied to each processing and assembly integrated unit at a necessary time. Defective parts in the working are eliminated, and only non-void parts are assembled. Even during the intermittent operation which is peculiar to the assembly line, the plastic melted is not resolved. It becomes easy to do teaching of the handling operation of the parts during the working and assembling thereof. When varying the type of products, it is also feasible to readily supply a raw material, replace dies, set working process conditions and change positional data required for handling parts.

It is to be noted that the idea of this processing and assembly integrated unit is not limited solely to plastic parts and pressed parts but, as a matter of course, applicable to other parts.

As described above, the invention brings about meritorious effects that part supplying and assembling devices are simplified with the use of a plurality of processing and assembly integrated units in which processing and assembling of the parts are coupled and combined in accordance with products to be produced, and it is possible to eliminate the necessities for an automatic warehouse and automated ground vehicles by getting rid of futility of mere movements of the parts. The above meritorious effects involve:

(a) reduction in management works and preparations associated with the supply of the parts;

(b) extension of a possible range of automatic assembling with respect to flexible and unshaped parts; and (c) promotion of automating production for producing various type products at a small or middle number.

Although the invention has been described in detail with reference to the embodiments shown in the accompanying drawings, it will be understood that the invention is not limited to those specific forms. Various changes or modifications may be made to them without departing from the scope or spirit of the appended claims.

What is claimed is:

1. A production system of molded parts, including a plastic part oriented processing and assembly integrated unit comprising:

an injection molding means for heat-fusing raw pellets fed by one-ejection-molded-part unit, injecting the fused pellets into dies, working and molding the melted pellets into dies, working and molding the melted pellets in a predetermined shape with a predetermined size through a clamping mechanism;

an assembly means for taking molded parts out of said dies with a grasping means and assembling the molded parts to target parts in assemblying positions on an assembly line continuous with a production line of said injection molding means at the same coordinate level with said production line with aid of handling of said grasping means;

an inspecting means for inspecting the molded parts by monitoring said processing conditions of said injection molding; and wherein said assembling means includes: a triaxial drive assembling robot in which a robot hand constituting said dies is secured to the tip of an arm; and a driving mechanism for opening and closing said robot hand in parallel.

2. The production system according to claim 1, wherein said inspecting means includes a mass measuring section capable of respectively measuring a total mass of said arm of said assembling robot of said assembling means and of said robot hand grasping the molded part and a total mass of said robot arm and of said robot hand which does not grasp the molded part.

3. A production system of molded parts, including a plastic part oriented processing and assembly integrated unit comprising:

an injection molding means for heat-fusing raw pellets fed by one-ejection-molded-part unit, injecting the fused pellets into dies, working and molding the melted pellets into dies, working and molding the melted pellets in a predetermined shape with a predetermined size through a clamping mechanism;

an assembly means for taking molded parts out of said dies with a grasping means and assembling the molded parts to target parts in assemblying positions on an assembly line continuous with a production line of said injection molding means at the same coordinate level with said production line with aid of handling of said grasping means;

an inspecting means for inspecting the molded parts by monitoring said processing conditions of said injection molding; and wherein said injection molding means is composed of: a material feed section capable of a quantitative feed by measuring and discharging the raw pellets of single part units from a hopper which has stored the raw pellets; a heating section having one or more than two plunger type heating cylinders for melting the raw pellets fed from said material feed section; an extrusion section capable of injecting the molten pellets in said heating cylinder and having a vibration mechanism for vibrating a vertically moving plunger up and down in said heating cylinder; dies consisting of a fixed die, a movable die capable of an opening/closing movement and a robot hand serving also as a molded part grasping means for forming a cavity for the molded part by intervening in between said fixed die and said movable die when said two dies are closed; and a clamping section for effecting clamping by causing said movable die of said dies to make the opening/closing movement.

4. The production system according to claim 3, wherein said material feed section includes: a measuring means for measuring masses of said hopper which has stored the raw pellets before and after feeding the material and detecting overs and shorts of the raw pellets of single part units from a difference therebetween; and a means, constructed of a feed screw, for feeding the raw pellets.

5. The production system according to claim 3, wherein said heating section consists of: a heating holder for supporting said heating cylinder; an induction heating coil wound on an outer periphery of said heating cylinder; a bar-like heating column composed of a material identical or similar to that of said heating cylinder and arranged coaxially with said heating cylinder; and a heating pin, so provided at a lower end of said heating cylinder as to be slidable in vertical directions, for sealing the molten pellets within said heating cylinder except for the injection time.

6. The production system according to claim 3, wherein said extrusion section includes: a stage vertically movable with aid of a rotating ball screw; and a vibrating mechanism consisting of a piezo vibrator for vibrating up and down the plunger secured to said stage.

7. The production system according to claim 3, wherein said clamping section includes: a double toggle mechanism connected to a mount and said movable die of said dies through pins; and a driving section of said double toggle mechanism, for clamping said dies in the horizontal direction through said double toggle mechanism.

8. A production system of molded parts, including a plastic part oriented processing and assembly integrated unit comprising:

an injection molding means for heat-fusing raw pellets fed by one-ejection-molded-part unit, injecting the fused pellets into dies, working and molding the melted pellets into dies, working and molding the melted pellets in a predetermined shape with a predetermined size through a clamping mechanism;

an assembly means for taking molded parts out of said dies with a grasping means and assembling the molded parts to target parts in assemblying positions on an assembly line continuous with a production line of said injection molding means at the same coordinate level with said production line with aid of handling of said grasping means;

an inspecting means for inspecting the molded parts by monitoring said processing conditions of said injection molding; and further comprising:

a means for inputting and storing a number of products to be produced;

a counting means for counting base parts for assembly processed respectively by said plastic part oriented processing and assembly integrated unit, a pressed part processing and assembly integrated unit and a processing and assembly integrated unit similar thereto;

a means for computing a number of the base parts to be processed by said respective units in accordance with an input value from said counting means and the number of the products to be produces; and a means for computing and outputting a quantify of and timing for the raw material to be replenished from a quantity of the raw materials which have already been fed to said respective units, a number of the base parts for assembly which have already been processed by said respective units and a number of the base parts to be processed subsequently.

9. The production system according to claim 8, wherein said plastic part oriented processing and assembly integrated unit includes means for making a temperature for melting the raw pellets changeable to lower the temperature, when waiting for a time in excess of a predetermined time occurs in the processing and assembling of the molded parts, in accordance with this waiting time.

10. The production system according to claim 8, including control means for controlling said respective units corresponding to changes in type of products to be produced as well as in the assembly line of the molded parts, said control means including a control device for being inputted with and outputting, to said respective units, data about a type and a quantity of the raw material to be fed, a change in said dies for use, processing conditions and also positional data necessary for handling the molded parts.

* * * * *